United States Patent
Sheshadri et al.

(10) Patent No.: US 11,269,760 B2
(45) Date of Patent: Mar. 8, 2022

(54) SYSTEMS AND METHODS FOR AUTOMATED TESTING USING ARTIFICIAL INTELLIGENCE TECHNIQUES

(71) Applicant: Accenture Inc., Chicago, IL (US)

(72) Inventors: Chandrasekhar Sheshadri, Mumbai (IN); Shalini Agarwal, Mumbai (IN); Indrajit Kar, Bengaluru (IN); Vishal Pandey, Bengaluru (IN); Saloni Tewari, Lucknow (IN); Dhiraj Suresh Panjwani, Thane (IN); Ebrahim Abdullah Plumber, Mumbai (IN); Rizwan Ahmed Saifudduza Siddiqui, Dombivili (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/733,172

(22) Filed: Jan. 2, 2020

(65) Prior Publication Data
US 2021/0209011 A1 Jul. 8, 2021

(51) Int. Cl.
*G06F 9/44* (2018.01)
*G06F 11/36* (2006.01)
*G06F 40/166* (2020.01)
*G06N 3/04* (2006.01)

(52) U.S. Cl.
CPC ...... *G06F 11/3688* (2013.01); *G06F 11/3684* (2013.01); *G06F 40/166* (2020.01); *G06N 3/0445* (2013.01)

(58) Field of Classification Search
None
See application file for complete search history.

(56) References Cited

U.S. PATENT DOCUMENTS

| 9,047,414 | B1 | 6/2015 | Matyjek |
| 10,846,141 | B1 * | 11/2020 | Hermoni ............. G06F 11/3006 |
| 2019/0179732 | A1 | 6/2019 | Venkatasubramanian et al. |
| 2019/0370160 | A1 * | 12/2019 | Raman ................ G06F 11/3664 |
| 2020/0019488 | A1 * | 1/2020 | Singh ....................... G06N 3/08 |

(Continued)

FOREIGN PATENT DOCUMENTS

WO WO-2018218371 A1 12/2018

OTHER PUBLICATIONS

Xiu et al., Predicting Returns with Text Data, Working Paper • No. 2019-69 (Year: 2019).*

(Continued)

*Primary Examiner* — Insun Kang
(74) *Attorney, Agent, or Firm* — Norton Rose Fulbright US LLP (57) ABSTRACT

Systems, methods, and computer-readable storage media facilitating automated testing of datasets including natural language data are disclosed. In the disclosed embodiments, rule sets may be used to condition and transform an input dataset into a format that is suitable for use with one or more artificial intelligence processes configured to extract parameters and classification information from the input dataset. The parameters and classes derived by the artificial intelligence processes may then be used to automatically generate various testing tools (e.g., scripts, test conditions, etc.) that may be executed against a test dataset, such as program code or other types of data.

20 Claims, 5 Drawing Sheets

(56) References Cited

U.S. PATENT DOCUMENTS

| | | | |
|---|---|---|---|
| 2020/0019492 A1* | 1/2020 | Fei | G06N 20/00 |
| 2020/0065712 A1* | 2/2020 | Wang | G06K 9/6255 |
| 2020/0097810 A1* | 3/2020 | Hetherington | G06N 3/0445 |
| 2020/0117580 A1* | 4/2020 | Lekivetz | G06F 11/3684 |
| 2020/0302540 A1* | 9/2020 | Xiu | G06F 40/30 |
| 2020/0356466 A1* | 11/2020 | Thangam | G06F 40/12 |
| 2020/0409827 A1* | 12/2020 | Chenguttuvan | G06K 9/6257 |
| 2021/0034813 A1* | 2/2021 | Wu | G06N 5/045 |
| 2021/0064829 A1* | 3/2021 | Lavallee | G06F 40/30 |
| 2021/0141863 A1* | 5/2021 | Wu | G06N 3/04 |
| 2021/0216822 A1* | 7/2021 | Paik | G06N 3/04 |

OTHER PUBLICATIONS

Liang et al., "SEML: A semantic LSTM model for software defect prediction," IEEE (Year: 2019).*
European Patent Office, Communication, Extended European Search Report issued for European Application No. 20204341.0, dated Apr. 28, 2021, 7 pages.

* cited by examiner

SYSTEMS AND METHODS FOR AUTOMATED TESTING USING ARTIFICIAL INTELLIGENCE TECHNIQUES

TECHNICAL FIELD

The present disclosure generally relates to dataset testing techniques and more specifically to systems and methods for utilizing machine learning and artificial intelligence to dynamically and automatically test a dataset.

BACKGROUND

Continuous integration/continuous delivery (CI/CD) processes are utilized to streamline software creation and delivery processes and often resemble a pipeline (e.g., a CI/CD pipeline) having a series of steps that may be performed to validate aspects of a system or the system's operations, such as deployment of new system functionality and features through test driven development. However, current processes for implementing such testing involve manual processes and suffer from several drawbacks. For example, a set of mapping specifications may be defined that outlines one or more goals for analyzing a dataset that includes gigabytes of data. The mapping specifications may specify how to transform the dataset or portions of the dataset into a format that may be utilized to provide meaningful information during the life cycle of development for the new features or functionalities of the system. Once the mapping specifications are defined, a user defines test conditions that specify when a record included in the dataset should be processed (e.g., subjected to testing according to the mapping specifications). During this process, the user determines test conditions based on the mapping specifications and manually inspects the records of the dataset to identify test data, where the test data includes data or records of the dataset that satisfy one or more of the test conditions. One reason why the identification of the test data and test conditions are identified using manual processes is that the mapping specifications are typically written in natural language format that does not have a definitive structure or syntax. Due to its natural language format, the mapping specification is not suitable as an input to a programmatically driven testing process (e.g., because programmatic processes typically require some type of structured format or syntax that can be processed using segments or portions of program code).

Once the test data has been identified, the user creates one or more tests designed to perform one or more testing processes on the test data. The one or more tests may include information for identifying the test data within the dataset. For example, if the dataset is an extensible markup language (XML) file, the tests may specify how the test data is identified within the .XML file. Information specifying how the test data may be identified in other file types may also be provided (e.g., for datasets other than XML filed). The one or more tests created based on the manually identified test data are then incorporated into a script or other type of program that may be executed against the dataset to generate an output, which may include information that indicates any errors in the test data, features/functionality being developed for the system, or other errors and anomalies.

SUMMARY

To overcome the challenges described above, aspects of the present disclosure provide systems, methods, and computer-readable storage media facilitating automated testing of datasets including natural language data are disclosed. In the disclosed embodiments, a device may include a testing engine configured to utilize rule sets to condition and transform an input dataset into a format that is suitable for use with one or more artificial intelligence processes configured to extract parameters and classification information from the input dataset. The parameters and classes derived by the artificial intelligence processes may then be used to automatically configure aspects of a testing process. For example, the parameters and classes may be used to automatically identify test conditions and test data satisfying the test conditions. Additionally, the parameters and classes may be utilized to automatically generate one or more testing scripts that may be executed against a test dataset, such as software code or other types of data.

Utilizing the techniques disclosed herein, which leverage artificial intelligence techniques to configure various aspects of a testing process based on natural language input data, testing processes may be completed more quickly. For example, the techniques described herein may result in a 30% reduction in time spent configuring and performing testing as compared to previously used techniques, which required significant portions of the testing process to be performed manually, especially the design and implementation of the testing processes (e.g., identification of test conditions, identification of test data, creation of scripts, etc.). As a result, the testing techniques facilitated by the present disclosure enable testing and development of software to be more rapidly achieved. Further, the techniques disclosed herein may generate tests that provide 100% code coverage, thereby ensuring the automated creation of test scripts and identification of test data thoroughly evaluates all of the functionality of the associated program code.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
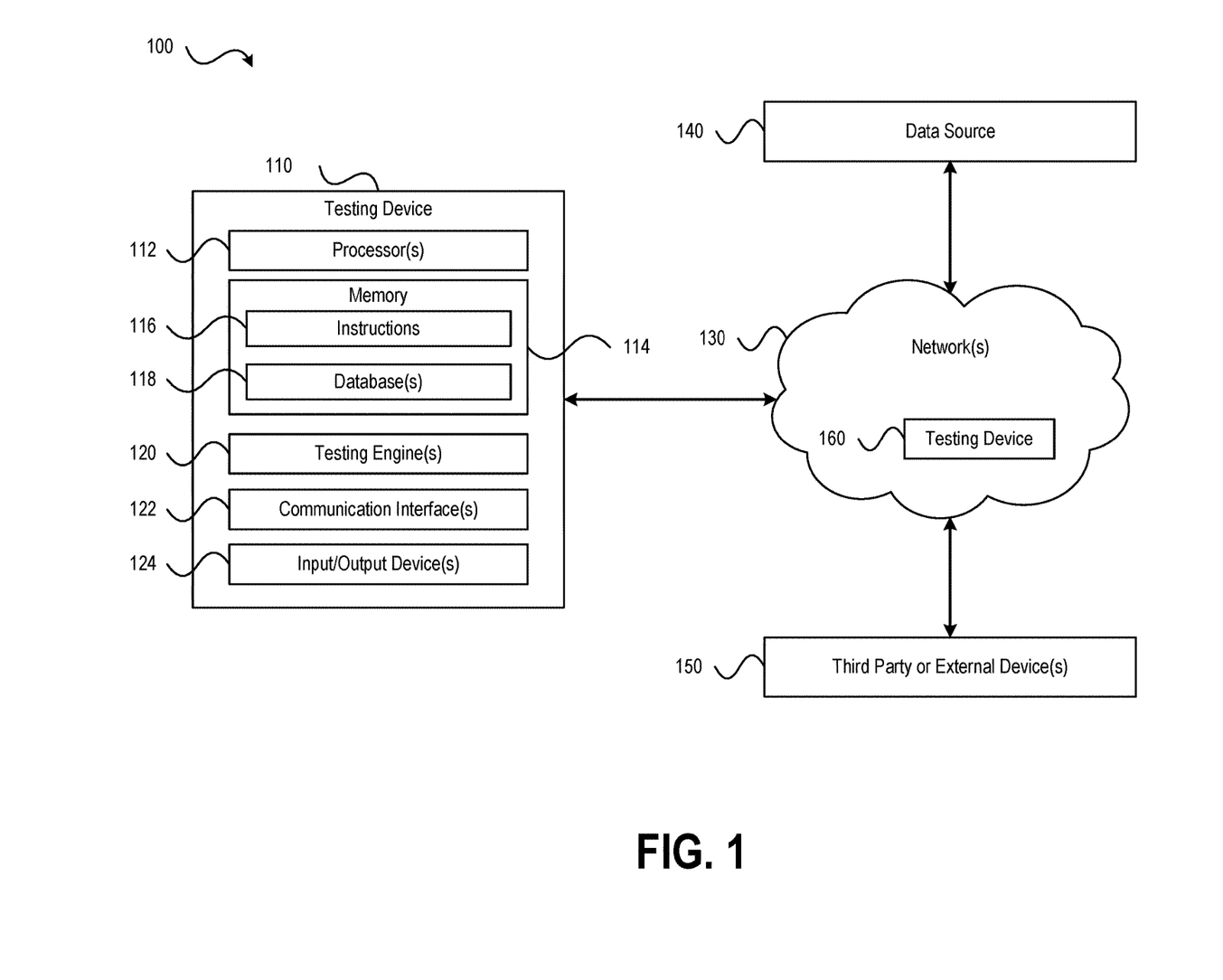
FIG. 1 is a block diagram illustrating a system for performing automated testing processes in accordance with aspects of the present disclosure.

As will become apparent from the description below, aspects of the present disclosure provide new processes for automatically and dynamically generating testing scripts for performing testing that involves, at least in part, data that contains natural language information, such as natural language text. This enables testing processes to be completed more quickly, allowing the testing and development of software to be more rapidly achieved. For example, the techniques described herein may result in a 30% reduction in time spent performing testing as compared to previously used techniques, which required significant portions of the testing process to be performed manually, especially the design and implementation of the testing processes (e.g., identification of test conditions, identification of test data, creation of scripts, etc.). Further, the techniques disclosed herein may be utilized to generate tests that provide 100% code coverage, thereby ensuring the automated creation of test scripts and identification of test data thoroughly evaluates all of the functionality of the associated program code. The techniques disclosed herein may also enable more robust testing techniques to be provided through additional training of the artificial intelligence models utilized to automate aspects of the testing configuration process. This capability enables testing tools configured in accordance with aspects of the present disclosure to be adapted to different testing scenarios and input datasets while still providing a high confidence level in terms of testing efficiency and test coverage Referring to FIG. 1, a block diagram illustrating a system for performing automated testing processes in accordance with aspects of the present disclosure is shown as a system 100. The system 100 may provide functionality that facilitates automated analysis and testing of data. As shown in FIG. 1, the system 100 includes a testing device 110. The testing device 110 includes one or more processors 112, a memory 114, one or more testing engines 120, one or more communication interfaces 122, and one or more input/output (I/O) devices 124. Each of the one or more processors 112 may be a central processing unit (CPU) or other computing circuitry (e.g., a microcontroller, one or more application specific integrated circuits (ASICs), and the like) and may have one or more processing cores. The memory 114 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 114 may store instructions 116 that, when executed by the one or more processors 112, cause the one or more processors 112 to perform the operations described in connection with the testing device 110 with reference to FIGS. 1-6. The one or more communication interfaces 122 may be configured to communicatively couple the testing device 110 to the one or more networks 130 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 124 may include one or more display devices, a keyboard, a stylus, one or more touchscreens, a mouse, a trackpad, a camera, one or more speakers, haptic feedback devices, or other types of devices that enable a user to receive information from or provide information to the testing device 110.

The one or more testing engines 120 may be configured to utilize machine learning and artificial intelligence techniques to process an input dataset and produce one or more outputs facilitating testing of aspects of the input dataset. For example, the input dataset may include one or more mapping specifications associated with program code that is to be tested. It is noted that program code tested according to the techniques disclosed herein may include source code, executable code, or other types of programming code written in one or more programming languages (e.g., python, C++, java, and the like), written in natural language, or another form of specifying program code. The testing may be related to the entire program code or only a portion thereof, such as a portion of the program code associated with new functionality or features. It is noted that testing of the program code is described for purposes of illustration, rather than by way of limitation and that the automated testing techniques disclosed herein may be readily applied to other types of input datasets for which previous processes for performing testing could not be readily automated due to characteristics of the input dataset, such as input datasets that include natural language data that does not have a specific structure or syntax.

The one or more testing engines 120 may include a set of conditioning rules that may be applied to the input dataset to condition the dataset prior to processing the input dataset using one or more machine learning and artificial intelligence techniques. The set of conditioning rules may be configured to modify the input dataset via different operations, such as removing punctuation, whitespaces, capitalization, stop words, and the like; performing lemmatization and stemming; tokenization; and other operations. In an aspect, executing the set of conditioning rules against the input dataset may produce a set of numeric features associated with the input dataset and an intermediate dataset. The one or more testing engines 120 may include a set of vectorization rules configured to transform the intermediate dataset into a vectorized dataset that includes a set of categorical features derived from the input dataset. By utilizing the set of conditioning rules and the set of vectorization rules, the one or more testing engines 120 may be configured to transform the input dataset into a set of inputs (e.g., the vectorized data and the set of numeric features) suitable for use with machine learning and artificial intelligence techniques.

To illustrate, machine learning algorithms operate on a numeric feature space, expecting input as a two-dimensional array where rows are instances and columns are features. As explained above, the initial input to the testing processes described herein may be an input dataset, such as a mapping specification, which is written in natural language. Because it is written in natural language, the input dataset is not suitable as an input to a machine learning algorithm since natural language data does not provide a numeric feature space. To utilize the machine learning techniques disclosed herein on natural language data, such as text, the natural language data (e.g., the mapping specification, etc.) may be subjected to one or more transformations (e.g., the transformations provided by the previously mentioned conditioning rules and vectorization rules) before being utilized with the machine learning techniques described herein. For example and referring to FIG. 2, a block diagram illustrating an exemplary process for transforming input data into a set of categorical and numeric features suitable for use with machine learning techniques in accordance with aspects of the present disclosure is shown.

Figure 2:
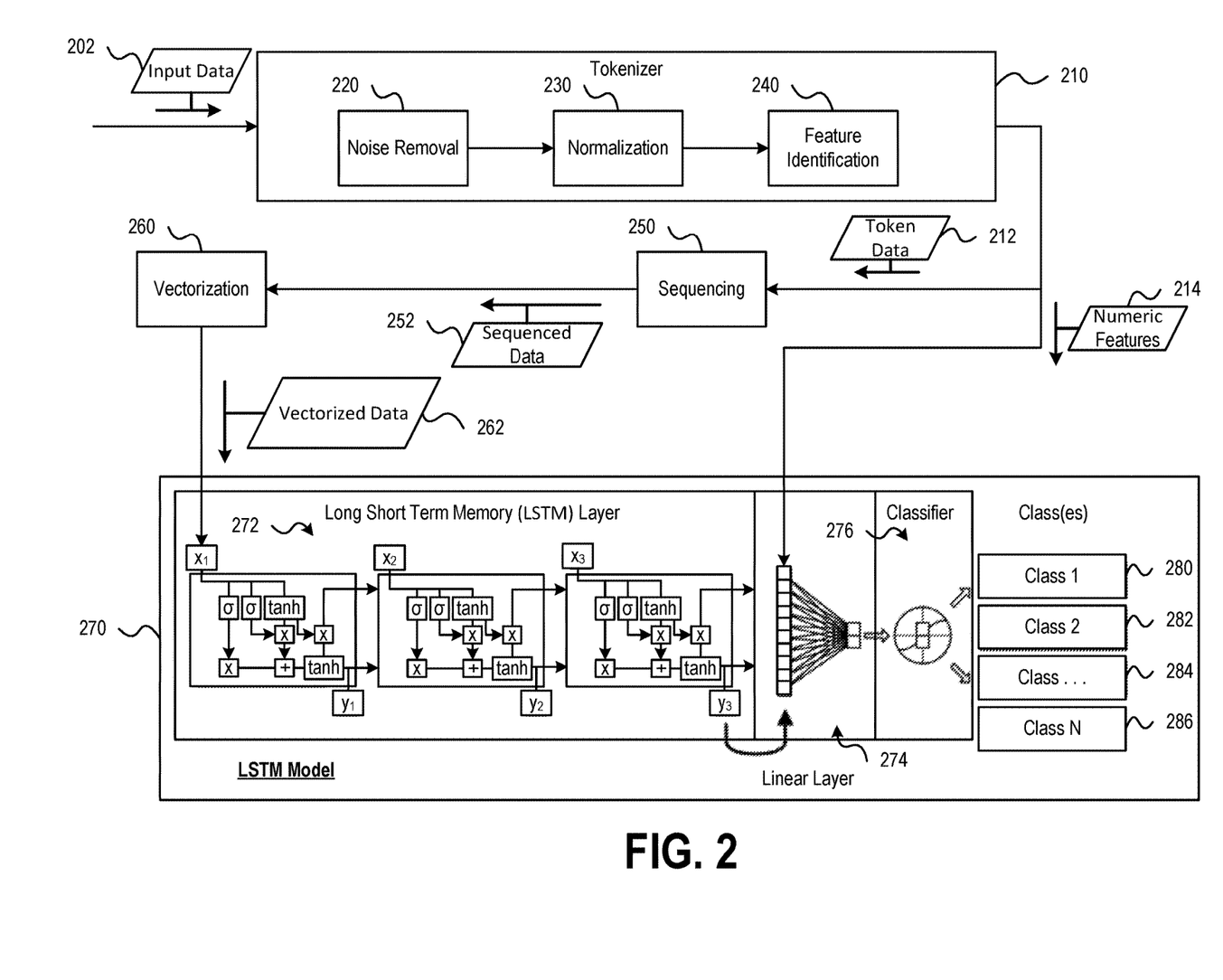
FIG. 2 is a block diagram illustrating an exemplary process for transforming input data into a set of categorical and numeric features suitable for use with machine learning techniques in accordance with aspects of the present disclosure.

As shown in FIG. 2, input data 202 (e.g., the mapping specification) may be processed to identify the categorical features and the numeric features. As shown in FIG. 2, the input data 202 may be provided to a tokenizer block 210. The tokenizer block 210 may include a noise removal block 220, a normalization block 230, and a feature identification block 240. Each of the blocks 220, 230, 240 may be configured to provide functionality for processing the input data 202 to generate token data 212 (e.g., a first data set) and a set of numeric features 214. In an aspect, the functionality provided by the tokenizer 210 may be provided via execution of a set rules against the input dataset 402, such as the set of conditioning rules described above.

The noise removal block 220 may be configured to remove portions of the input data 202. For example, the noise removal block 210 may remove hypertext markup language (HTML) tags, stop words (e.g., "a", "an", "the", etc.), punctuation marks (e.g., periods, commas, semi-colons, etc.), white spaces, uniform resource locators (URLs), and the like from the input data 202. The normalization block 230 may be configured to perform tokenization, lemmatization and stemming (e.g., removing suffixes from words, such as to remove "ing", "ed", or other suffixes from words present in the input data 202, and the like), sentence segmentation (e.g., dividing the input data 202 into component sentences, and the like. During the tokenization process, text data may be broken up into individual words and each individual word may represent a token. Additionally, certain elements of the text data may be treated as special token elements, such as white spaces, and these additional token elements may be handled differently than tokens associated with words within the text data, such as by removing white space tokens during the sentence segmentation process. The numeric feature identification block 240 may be configured to identify numeric features 214 within the normalized input data 202 via word standardization or other techniques. As an example, the numeric feature identification block 240 may utilize word standardization to replace particular words present in the input data 202 with the root of that word. The root of the word(s) may be identified based on a lookup table with help of lemmatization (e.g., as described with reference to the normalization block 230). The numeric feature(s) may then be generated by counting the number of tokens or characters in the input data. It is noted that the exemplary process of generating the numeric features 214 described above has been provided for purposes of illustration, rather than by way of limitation and that other use cases or scenarios may utilize additional techniques to generate the set of numeric features. In addition to producing the numeric features 214 (e.g., via the numeric feature identification block 230), the tokenizer block 210 may be configured to produce token data 212.

To illustrate the concepts described above, suppose that the input data 202 includes mapping specifications that include some query specifications that are long and others were short. Further, the mapping specifications may contain different commands, different conditional statements (e.g., "if" statements, comparison, etc.), irregular line spacing, and other irregularities. Through the above-described functional blocks and the processes each block performs the input data 202, which may be specified as natural language, is subjected to various lexical analysis techniques to identify words, remove punctuation, remove stop words, convert upper case words and letters to lower case words and letters and the like. In addition to utilizing lexical analysis, post-lexical analysis processes may be utilized and may focus on the input data not at the text level but on word level via processes such as stemming and lemmatization, which enables the input data to be converted or tokenized data suitable for vectorization, as described in more detail below.

The token data 212 may be provided to a sequencing block 250, which may be configured to transform the token data 212 into sequenced data 242, which may be provided to a vectorization block 260, which may be configured to transform the sequenced data 252 into a set of vectorized data 262. In an aspect, the vectorization block 260 may execute a set of vectorization rules against the sequenced data 242 to generate the vectorized data 262, as briefly described above. In an aspect, the set of vectorization rules may be configured to vectorize the sequenced data 252 using a global vectors for word representation (GloVe) process. As a result of the vectorization process, words within the natural language data (e.g., the sequenced data 252 generated based on the token data 212 derived from the input data) having similar meanings may lie closer to each other in the defined vector space.

To illustrate the processes described above, suppose that the natural language data included in the input data 202 included the sentence "This document is for patent." A vectorized form of this sentence may be generated as follows:

"This": 1
"document": 1
"was": 0
"is": 1
"for": 1
"patent": 1
"how": 0

In the example above, the tokens "This", "document", "was", "is", "for", "patent", and "how" are associated with numeric features representing the count of the number of times each word occurs within the input data. It is noted that the term "This" may be represented as "this" (e.g., without a capital "T" due to the normalization processing or noise processing described above) in some aspects. The set numeric features 214 may be combined with the vectorized data 262 by appending set of numeric features 214 to the vectorized data 262 in some aspects.

As shown above, input data 202, such as the mapping specifications, which may include query command data, may have characteristics similar to big data (e.g., does not have a definite natural language structure, etc.) rendering it unsuitable for use with artificial intelligence and machine learning techniques and contributing to the present user of largely manual techniques for performing testing of datasets similar to the testing described herein. However, through the processes provided by the tokenizer block 210 (e.g., the noise removal block 220, the normalization block 230, and the feature identification block 240), the sequencer block 250, and the vectorization block 260, testing data may be conditioned to a set of numeric features (e.g., the numeric features 214) and a set of categorical features (e.g., the vectorized data 212) suitable for use with machine learning, artificial intelligence analysis, and as deep learning techniques. Stated another way, one of the challenges solved by the present disclosure is to provide a way to transform an input dataset (e.g., the input data 202) into one or more data structures (e.g., a vectorized set of categorical features and a set of numeric features) suitable for processing via machine learning techniques, such as neural networks.

The vectorized data 262 may correspond to the categorical features utilized by the testing model according to aspects of the present disclosure. To illustrate, as shown in FIG. 2, the vectorized data 262 may be provided as an input to a long short term memory (LSTM) network model 270, which is a form of neural network, to perform deep learning analysis of the input data 202 based on the vectorized data 212 and the numeric features 214. In an aspect, the numeric features 214 may include information associated with sentence length or other information associated with characteristics the vectorized data 212. It is to be understood that the use of LSTM networks is described below with reference to FIG. 2 for purposes of illustrating aspects of utilizing artificial intelligence and deep learning techniques to improve aspects of a testing process, such as a testing process that may be performed as part of a CI/CD pipeline during software development or for other purposes, and that other artificial intelligence, machine learning, and deep learning techniques may also be used.

LSTM networks typically have a chainlike structure, but the repeating module utilized by the LSTM model 270 has a different structure. For example, instead of having a single neural network layer, the LSTM model 270 includes four layers that interact in a special way, described in more detail herein. The LSTM model 270 has a chainlike structure with a plurality of gates that serve to regulate information as it passes through the LSTM model 270. As shown in FIG. 2, the LSTM model 270 may include an LSTM layer 272, a linear layer 274, and a classifier layer 276 and may output a dataset including one or more classes. It is noted that the dataset of one or more classes is shown in FIG. 2 as having a first class 280, a second class 282, zero or more additional classes 284, and an N-th class 286. It is noted that the N classes output by the LSTM model 270 may include more than four classes (e.g., N>4) or less than for classes (e.g., 0<N<4), thus aspects of the present disclosure are not to be limited to generation of an LSTM model output have a particular number of classes. Additional aspects of the classes output by the LSTM model 270 are described below.

As shown in FIG. 2, the vectorized data 262 may be received as an input to the LSTM model 270 and provided as an input to the LSTM layer 272. The LSTM layer 272, upon receiving the vectorized data 262, may compute values for $i_t$, the input gate, and $\tilde{C}_t$, which represents the candidate value for the states of the memory cells at time t. As an example, $i_t$, and $\tilde{C}_t$ may be computed as follows:

$$i_t = \sigma(W_i x_t + U_i h_t + b_i),$$

$$\tilde{C}_t = \tanh(W_c x_t + U_c h_{t-1} + b_c),$$

where U is a weight vector for a hidden layer, V is a weight vector for an output layer, W is a same weight vector for different timesteps (e.g., "W" is a weight vector corresponding to an input X, "same" indicates there is only one weight vector for every input "X," and the timesteps in this context can be visualized as the number of words in a particular sentence (assuming each word is converted to a vector)), X is a word vector for an input word, y is a word vector for an output word, b is a bias vector, and $h_{t-1}$ is one of the "hidden" layer vectors. It is noted that each of the gates (e.g., the input gate, forget gate, and output gate) and candidate cell state(s) may be associated with their own weight matrices W and bias vectors b, which may be learned.

Additionally, the LSTM layer 272 may compute a value for $f_t$, which corresponds to the activation of the forget gates of the LSTM layer 272 at time t. As an example, $f_t$ may be computed according to:

$$f_t = \sigma(W_f x_t + U_f h_{t-1} + b_f),$$

where σ is a sigmoid function, W, X, U, H, and B are the same as described above.

Given the value of the input gate activation $i_t$, the forget gate activation $f_t$, and the candidate state value $\tilde{C}_t$, the LSTM layer 472 computes a value $\tilde{C}_t$ for the state of the memory cells of the LSTM layer 472 at time t. As an example, $\tilde{C}_t$ may be calculated as:

$$C_t = i_t * \tilde{C}_t + f_t * C_{t-1}.$$

Having computed the new state of the memory cells of the LSTM layer 272, the LSTM model 270 can compute values for the output gates of the LSTM layer 272. As an example, the output gate values may be determined according to:

$$o_t = \sigma(W_o x_t + U_o h_{t-1} + V_o C_t + b_o),$$

$$h_t = o_t * \tanh(C_t).$$

As shown in FIG. 2, each gate may have a sigmoid neural network layer that provides an output between [0, 1] to weigh the passing limit of the component, and a point-wise multiplication operation. The cell state $C_t$, may present across all the time steps and changed by the interactions at each of the time steps. To retain the information flowing across the LSTM layer 272 via the cell state, three types of gates are provided: (1) an input gate that controls the contribution from a new input to the memory; (2) a forget gate that controls the limit up to which a value is pertained in the LSTM layer 272; and (3) an output gate to limit how the memory contributes to the activation block of output. The outputs of the LSTM layer 272 may be combined with the numeric features 214 at the linear layer 274 to form an output vector that includes information associated with the vectorized data 262 (e.g., the categorical features) and the numeric features 214. In an aspect, the sequencing layer 274 may be configured to combine the outputs of the LSTM layer 272 with the numeric features 214 via concatenation.

Once the linear layer 274 generates the output vector (e.g., by combining the information associated with the vectorized data 262, such as the outputs of the LSTM layer 272, and the numeric features), the classifier layer 276 may analyze the data stored in the output vector and assign at least a portion of the output vector data to the one or more classes (e.g., the classes 280, 282, 284, 286). As an example, the classifier layer 276 may be configured to analyze the output vector using a softmax function and then determine a classification to assign the data being evaluated based on the output of the softmax function. The softmax function may generate a numeric output and then assign the data being analyzed by the softmax function to one of the classes based on whether the numeric output falls within a particular numeric range (where the numeric ranges are different from the numeric features derived from the input data). To illustrate, if the output falls within a first numeric range the data may be assigned to the class 280, if the output falls within a second numeric range the data may be assigned to the class 282, if the output falls within a third numeric range the data may be assigned to the class 284, and if the output falls within a fourth numeric range the data may be assigned to the class 286. In an aspect, the one or more classes may include three classes, such as a "straight move" class, an "assignment" class, and a "rule" class. The straight move class may be associated with a move action (e.g., move A to B) and any terms following the move may become output parameters associated with the "straight move" class. The "assignment" class may be associated with an assignment operation (e.g., assign X to Y), which may result in the corresponding input text (e.g., the analyzed data) being returned as an output parameter. The "rule" class may be associated with simple and complex rule-type operations, such as "if-else" statements and the like, which may generate zero or more input parameters and zero or more output parameters. As an illustrative example, if the data assigned to the "rule" class corresponds to an "if-else" statement, the text-based features between the "if" and "else" portions of the statement may become input parameters and the text-based features following the "else" portion of the statement may become output parameters.

Figure 3:
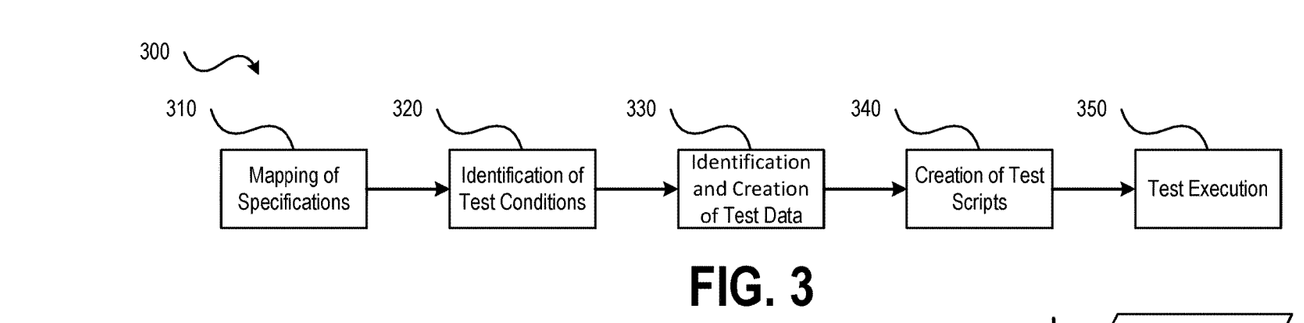
FIG. 3 is a block diagram illustrating various stages of a testing process according to aspects of the present disclosure.

While FIG. 2 and the description above illustrate exemplary aspects of processes that may be used by a testing engine (e.g., the one or more testing engines 120 of FIG. 1) to transform a natural language input dataset into input parameters and output parameters that may be used in a data testing process (e.g., a testing process that may be utilized with a CI/CD pipeline during software development), the testing engines disclosed herein may be configured to provide additional functionality to automate other aspects of the testing process. For example and referring to FIG. 3, a block diagram illustrating various stages of a testing process according to aspects of the present disclosure is shown as a testing process 300. As shown in FIG. 3, the testing process may begin with step 310, during which a mapping specification(s) that provides information to guide the testing process (e.g., pseudocode or other natural language data configured to describe the testing process and/or other information) may be created. At step 320, test conditions may be identified and at step 330, test data may be identified. As described above with reference to FIG. 2, testing engines configured according to the present disclosure may utilize machine learning and artificial intelligence techniques, such as the tokenization and LSTM modelling techniques described above, to automatically identify test conditions and test data based on an input dataset (e.g., a mapping specification) despite the input dataset including natural language data. In addition, the testing process 300 includes, at step 340, creation of test scripts. The testing engines of embodiments may be configured to utilize the input and output parameters derived from the input dataset by the tokenization and LSTM modelling techniques described above to automatically generate test scripts that include test conditions derived from the input and output parameters and configured to be applied, during testing, to the relevant test data, as described in more detail below. At step 350, the testing process 300 includes executing the one or more test scripts automatically generated by the testing engines. Further aspects of the testing processes 300 described and illustrated with reference to FIG. 3 and which may be performed by testing engines (e.g., the one or more testing engines 120 of FIG. 1) are shown in FIG. 4, which is a block diagram illustrating exemplary operations for automating portions of a testing process in accordance with aspects of the present disclosure.

Figure 4:
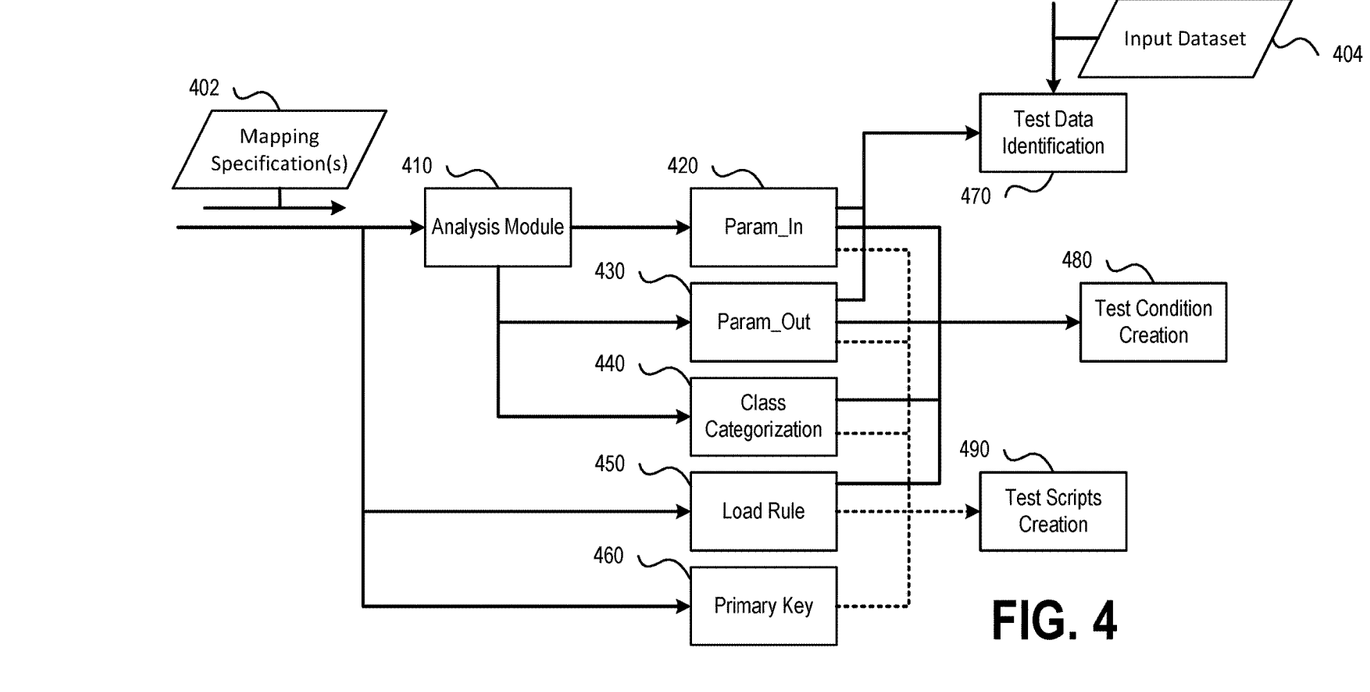
FIG. 4 is a block diagram illustrating exemplary operations for automating portions of a testing process in accordance with aspects of the present disclosure.

As shown in FIG. 4, a mapping specification 402 may be provided to an analysis module 410. In an aspect, the mapping specification 402 may be the input data 202 of FIG. 2 and the analytics module 410 may be configured to perform the processing operations described above with reference to FIG. 2. The mapping specification 402 may include natural language data and the analytics module 410 may be configured to utilize functionality similar to the functionality described with reference to the tokenizer block 210, the sequencing block 250, the vectorization block 260, and the LSTM model 270 of FIG. 2 to process the mapping specification 402. As a result of the processing performed by the analytics module 410, a set of input parameters 420, a set of output parameters 430, and a set of classes 440 may be generated.

The set of input parameters 420 and the set of output parameters 430 may be provided to a test data identification module 470, which may be configured to automatically identify a set of test data based on an input dataset 404, as in step 330 of FIG. 3. It is noted that the input dataset 404 is distinct from the mapping specifications and includes the actual data that is to be tested, as opposed to the mapping specification that describes the types of testing that is to be performed or other information regarding test of the input dataset 404. In an aspect, the input dataset 404 may include program code or portions of program code that are to be tested (e.g., prior to distribution or production use of the program code), although aspects of the present disclosure may be readily applied to data testing of other types of datasets that utilize natural language data. The portion(s) of the input dataset 404 tested by the scripts generated by the test scripts creation module 490 may correspond to the test data identified by the test data identification module 470. For example, the test data identification module 470 may utilize its inputs (e.g., the set of input parameters 420 and the set of output parameters 430) to automatically identify test data from the input dataset 404.

The test data identified by the test data identification module 470 may be determined to be suitable to cover test conditions indicated by the set of input parameters 420 and the set of output parameters 430. In an aspect, the test data identified within the input dataset 404 by the test data identification module 470 may not include the entire input dataset 404—instead, the test data identified by the test data identification module 470 may only include a portion of the input dataset 404 suitable to ensure that all test conditions may be evaluated during the testing. To that end, the test data identification module 470 may be configured to prioritize identification of data suitable for testing multiple test conditions for inclusion within the test data. For example, if a first portion of the data may be used to test X number of test conditions and a second portion of the data may be used to test Y number of test conditions, where Y>X and all test conditions included in X are also included in Y, the test data identification module 470 may be configured to select the second portion of the input dataset 404 for inclusion in the test data and the first portion of the input dataset 404 may not be identified for inclusion in the test data. In this manner, the amount of data that will be tested is minimized while simultaneously creating a test dataset that may be used to test all test conditions.

The set of input parameters 420, the set of output parameters 430, and the set of classes 440 may be provided to a test condition creation module 480, along with load rule data 450. The test condition creation module 480 may be configured to automatically create test conditions, as in step 320 of FIG. 3. For example, the test condition creation module 480 may utilize the set of input parameters 420, the set of output parameters 430, and the classes 440 to categorize a load rule 450 and generate test conditions for testing the input dataset 404 based on the categorization. The load rule data 450 may include transformation logic provided by the input mapping data that defines how the output should look based on the input data coming through. For example, the load rule data 450 may specify a simple transformation involving using "if-else" logic (e.g., if the source value is "CT" then populate "Connecticut" else populate "Countrywide" in the target).

A test scripts creation module 490 may receive the set of input parameters 420, the set of output parameters 430, the set of classes 440, the load rule(s) 450, and primary key information 460 as inputs and then use those inputs to generate one or more scripts configured to test at least a portion of the input dataset 404 (e.g., at least the portion of the input dataset 404 identified by the test data identification module 470) based on the test conditions created by the test condition creation module 480. Test scripts may be generated by regular expression scripts using the input parameters 420, the output parameters 430, the classes 440, the load rule data 450, and the primary key 460. This is done by using the primary key of the target and source tables as well. An example of a test script may be: SELECT CURR_MKT_SB-TYP_3 (e.g., the output parameter predicted by the LSTM model), POL_ACCT_NBR (e.g., the primary key of the target table) FROM QUOTE_POL MINUS SELECT src_mkt_sbtyp_3, src_pol_nbr FROM PLWQ. The entire query written above for the test validation may correspond to one class that has been predicted by the LSTM model. Similar other structured queries may be created for other classes that are predicted by the LSTM model.

Referring back to FIG. 1, the one or more testing engines 120 may be configured to provide the functionality described and illustrated above with reference to FIGS. 3 and 4. For example, the one or more testing engines 120 may be configured to identify test data, as in the test data identification module 470 of FIG. 4, create test conditions, as in the test conditions creation module 480 of FIG. 4, and generate one or more test scripts, as in the test script creation module 490 of FIG. 4. In an aspect, the functionality provided by the modules 410, 470, 480, 490 may be stored as the instructions 116, which may be executed by the one or more processors to perform the operations described with reference to FIGS. 3 and 4.

Once created, the one or more testing engines 120 may be configured to execute the test scripts against the test data (e.g., the test data identified by the test data identification module 470) to perform data testing, such as the testing that may be performed during CI/CD pipeline testing as part of a software development process or for other types of testing purposes. As described above with reference to FIG. 4, the test data may be identified such that the test conditions can be evaluated or tests using a minimal set of test data. This enables the testing to be performed faster and more efficiently than previous techniques, which used manual identification of test data and did not optimize the test data relevant to the test conditions (i.e., the user simply inspects the test data to identify a record or portion of the data satisfying a single test condition, resulting in significantly more portions of the test data needing to be tested and more test scripts to be executed).

It is noted that the testing performed by the system 100 is not limited to local testing (e.g., testing of datasets stored locally on the testing device 110). For example, as shown in FIG. 1, the system 100 may include one or more data sources 140, which may be accessible to the testing device 110 via the one or more networks 130. A user (e.g., a software developer or other type of user) may store software code and mapping specifications at data source 140, which may be a database server or some other device providing network-based access to data for testing purposes. The data to be tested may be retrieved by the testing device 110 from the data source 140 and the processes described above may be performed to process the data (e.g., generate categorical and numeric features, classes, input and output parameters, etc.) and as a result, a set of scripts may be generated and executed to test the data.

As an additional or alternative example, operations of the testing device 110 may be provided in a cloud-based system. To illustrate, FIG. 1 shows a testing device 160 deployed within the one or more networks 130. The testing device 160 may include a collection of computational resources (e.g., processors, etc.) and other hardware/software accessible on a network and may be configured to provide the functionality described herein with respect to automated testing processes and execution. In such an arrangement, the functionality described with reference to the testing device 110 in FIGS. 1-6 may facilitate embodiments where the testing functionality may be provided as a service. For example, a user associated with a third party or external device 150 may be provided with network-based access to the testing processes and functionality provided by the testing device 160. In such an arrangement, the user may be authenticated with the cloud-based testing device 160 and may upload input datasets (e.g., mapping specifications and testing datasets) to the testing device 160. One or more graphical user interfaces (e.g., web-based interfaces, etc.) may be provided to facilitate uploading of the input datasets and other functionality for utilizing the testing processes provided by the testing device 160. Such an arrangement may enable more robust application and software development by increasing the time-to-live cycle (e.g., by reducing the time required to complete the testing process) and may enable companies to focus more on software development, rather than maintaining staff dedicated to performing the testing operations provided by the testing devices 110, 160.

Figure 5:
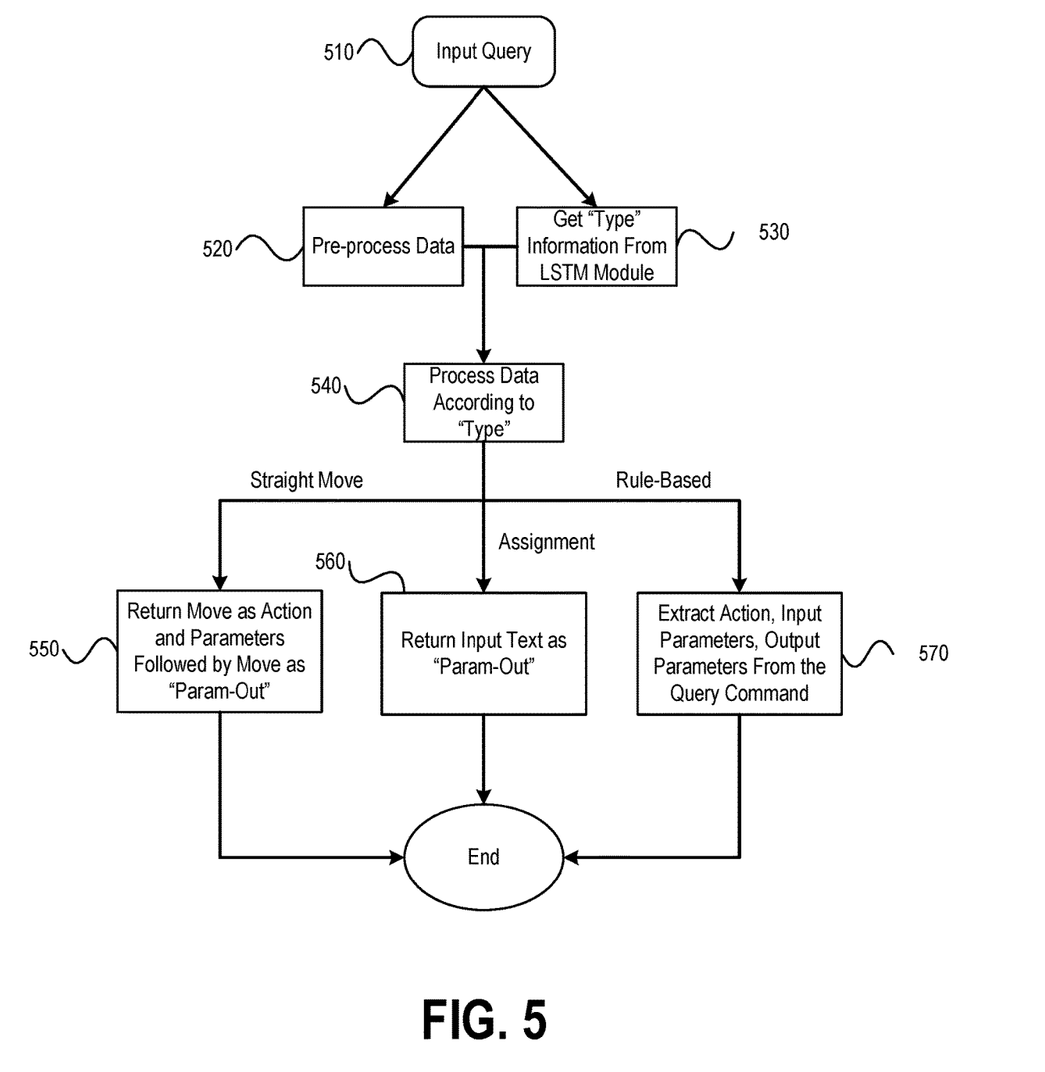
FIG. 5 is an exemplary process for automatically generating testing scripts in accordance with aspects of the present disclosure.

Referring to FIG. 5, an exemplary process for automatically generating testing scripts in accordance with aspects of the present disclosure is shown. It is noted that the operations described with reference to FIG. 5 are meant to further illustrate aspects of the testing functionality provided by the one or more testing engines 120 of FIG. 1 and the various logical blocks and modules illustrated and described with reference to FIGS. 2-4. Thus, it is to be understood that the functionality described below with reference to FIG. 5 may be provided by the testing device 110 (or the testing device 160) of FIG. 1 and any associated modules or logical blocks described and illustrated with reference to FIGS. 2-4. As will be apparent from the description that follows, the exemplary logical blocks and processes described with reference to FIG. 5 may be utilized to automate processes for generating testing scripts, such as may be used to perform testing of program code as part of a CI/CD software development process.

At block 510, an input dataset may be received. In an aspect, the input dataset received at block 510 may include first information (e.g., a mapping specification) and second information (e.g., a test dataset). At block 520, the input data may be processed. The processing performed at block 520 may be similar to at least some of the operations described above with respect to the tokenizer 210 of FIG. 2. However, it is noted that the processing at block 520 may include different or additional operations depending on the particular use case to which the process illustrated in FIG. 5 is being applied. For example, in some aspects, the processing at block 520 may be based on the test data while in other aspects the processing at block 520 may additionally or alternatively operate on the mapping specification. At block 530, type or class information may be derived from the input dataset. In an aspect, the class information may be derived as described above with reference to the outputs of the LSTM model 270 of FIG. 2. For example, the class information may indicate "straight moves," "assignments," "rules," and the like.

At block 540, data output by the block 520 may be processed according to the class information derived in block 530. If the class information indicates a portion of the input data being tested is associated with a "straight move," the portion of the data may be processed at block 550, where the "move" may be categorized as the action to be performed and the term(s) included in the test data followed by "move" may become the output parameters. As an illustrative example, a load rule may be stated as "DIRECT MOVE SRC_MKT_SBTYP_3" which may specify a column of the input file. The class that is predicted by the LSTM module is a "Straight Move." Because it says to straight move "MKT_SBTYP_3," this would become the "Output Parameter" that should be present in the final output of that target field. If the class information indicates a portion of the input data being tested is associated with a "assignment," the portion of the data may be processed at block 560, where the corresponding input text included in the test data may be returned as an output parameter. As an illustrative example, a load rule may be stated as "MOVE 'KPPI'" which is a hard coded value rather than one coming in the input file. The class that is predicted by the LSTM module may be a "Default Assignment." The fact that it says to Move "KPPI," this would become the "Output Parameter" that should be present in the final output of that target field. If the class information indicates a portion of the input data being tested is associated with a "rule," the portion of the data may be processed at block 570, where the text included in the test data is processed to extract required information depending upon the rule (e.g., the type of query). As an example, if the rule classification indicates an "if-then-else" statement, the text between "if" and "then" becomes an input parameter, the text between "then" and "else" becomes a first output parameter and the text following "else" becomes a second output parameter. As the input data is processed via the exemplary flow described above, a set of scripts configured to test the input dataset (e.g., test the test data in accordance with the mapping specification) may be generated, which may be subsequently executed to perform testing as described above.

Figure 6:
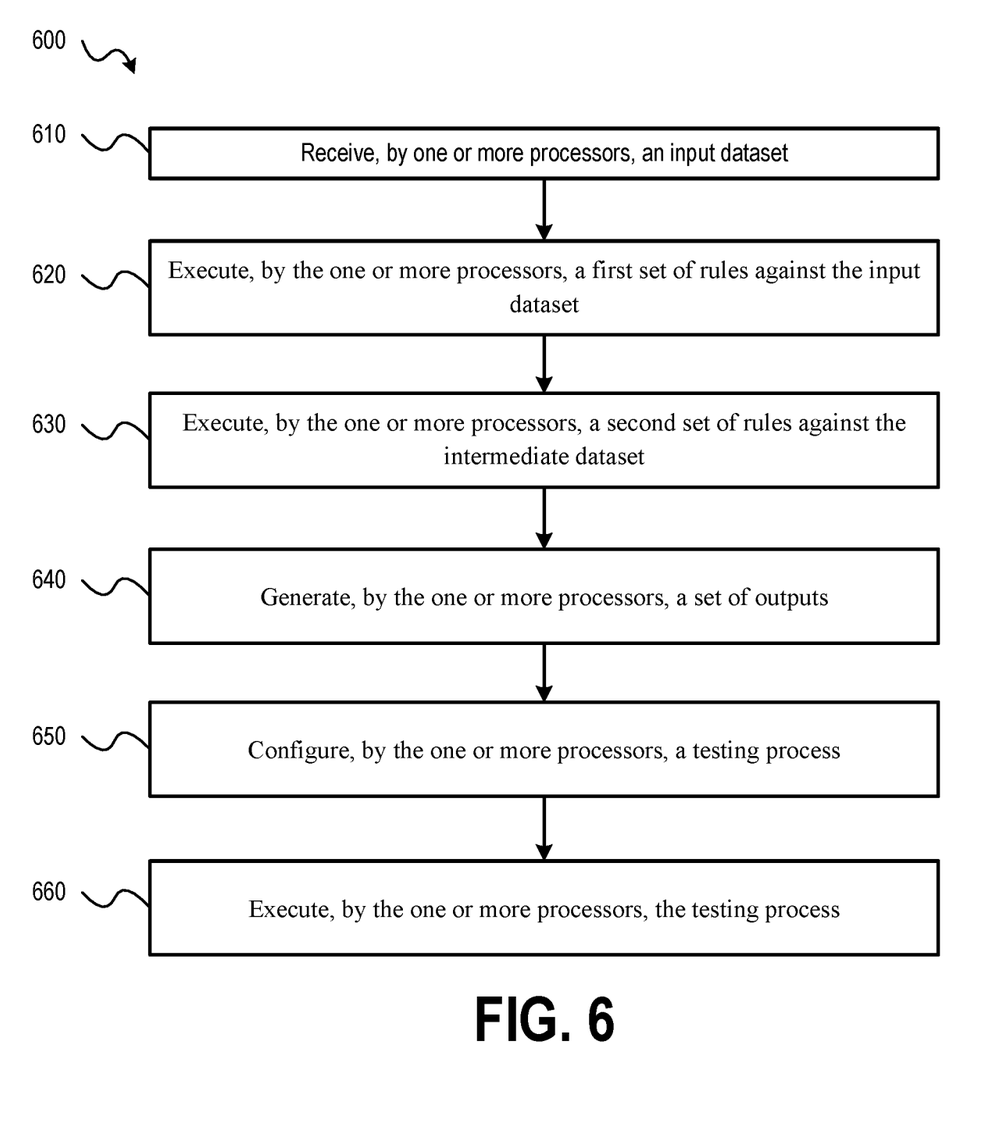
FIG. 6 is a flow diagram of an exemplary method for performing a testing process in accordance with aspects of the present disclosure.

Referring to FIG. 6, a flow diagram of an exemplary method for performing a testing process in accordance with aspects of the present disclosure is shown as a method 600.

In an aspect, the steps of the method 600 may be performed by a system, such as by the system 100 of FIG. 1 and more specifically the testing device 110 of FIG. 1. The steps of the method 600 may be stored as instructions (e.g., the instructions 116 of FIG. 1) that, when executed by one or more processors (e.g., the one or more processors 112 of FIG. 1), cause the one or more processors to perform the steps of the method 600.

At step 610, the method 600 includes receiving, by one or more processors, an input dataset. In an aspect, the input dataset may be the input dataset 202 of FIG. 2 or the input dataset 402 of FIG. 4. The input dataset may include natural language data. For example, the input dataset may be a mapping specification associated with software being developed. In an aspect, the input dataset may be another type of data that includes natural language data. At step 620, the method 600 includes executing, by the one or more processors, a first set of rules against the input dataset. In an aspect, the first set of rules may be configured to perform the operations described above with respect to the tokenizer 210 of FIG. 2. For example, the first set of rules may be configured to generate the intermedia dataset using one or more data conditioning processes. The one or more data conditioning processing may include one or more of the processes described with reference to the tokenizer 210 of FIG. 2, such as removal of punctuation, removal of stop words, removal of spaces, lemmatization, stemming, sentence segmentation, tokenization, or combinations thereof. The execution of the first set of rules against the input dataset may be configured to generate an intermediate dataset and a first set of features. As described with reference to FIG. 2, the intermediate dataset may include tokenized data and the first set of features may include numeric features.

At step 630, the method 600 includes executing, by the one or more processors, a second set of rules against the intermediate dataset. The second set of rules may be configured to generate a second set of features. For example, the second set of rules may be configured to process the intermediate dataset via sequencing and vectorization, as described with reference to the sequencing block 650 and the vectorization block 660 of FIG. 2. The second set of features may include vectorized data. At step 640, the method 600 includes generating, by the one or more processors, a set of outputs using an artificial intelligence process configured to generate the set of outputs as a function of the first set of features and the second set of features. For example, the artificial intelligence process may include an LSTM model and the set of outputs may be generated as described above with respect to the LSTM model 270 of FIG. 2. The set of outputs may include a set of input parameters, a set of output parameters, and a set of classes.

At step 650, the method 600 includes configuring, by the one or more processors, a testing process based on the set of outputs. The testing process may be configured to test at least a portion of a test dataset using a set of test conditions. In an aspect, the test conditions may be generated as described with reference to FIGS. 3-5. For example, the configuration of the testing process may include identifying test data based on the set of input parameters and the set of output parameters, as described with reference to test data identification block 470 of FIG. 4; generating a set of tests conditions based on the set of input parameters, the set of output parameters, and the set of classes, as described with reference to test condition creation block 480 of FIG. 4; and generating one or more scripts configured to analyze at least the portion of the test dataset using the set of test conditions, as described above with reference to script generation block 490 of FIG. 4.

At step 660, the method 600 includes executing, by the one or more processors, the testing process. Executing the testing process may include running the one or more test scripts against the test dataset. For example, where the testing process is configured to evaluate newly developed software (e.g., as part of a CI/CD pipeline), the one or more test scripts may be executed against a test dataset that includes program code corresponding to the newly developed software. Because the operations of the method 600 utilize the new processes disclosed herein to automatically and dynamically generate the testing scripts, the testing process may be completed more quickly, allowing the testing and development of software to be completed more rapidly. For example, testing has shown that the techniques described herein may result in a 30% reduction in the time and effort required to perform data testing as compared to previously used techniques, which required significant portions of the testing process to be performed manually. Further, as described above, the techniques disclosed herein may be utilized to test 100% of executed test cases (e.g., due to the identification of the test data based on the set of input parameters and the set of output parameters derived as described with reference to FIG. 2).

Additionally, the techniques disclosed herein may facilitate more robust testing. To illustrate, although the testing processes disclosed herein have primarily been described in the context of testing program code, aspects of the present disclosure may be readily adapted to other types of tests, which may only require additional training of the artificial intelligence models utilized to automate the test configuration processes. This capability enables testing tools configured in accordance with aspects of the present disclosure to be adapted to different testing scenarios and input datasets while still providing a high confidence level in terms of testing efficiency and test coverage.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
receiving, by one or more processors, an input dataset comprising natural language data;
executing, by the one or more processors, a first set of rules against the input dataset to generate an intermediate dataset and a first set of features, the first set of features comprising numeric features;
executing, by the one or more processors, a second set of rules against the intermediate dataset to generate a second set of features from the intermediate dataset, the second set of features comprising non-numeric features;
executing, by the one or more processors, a trained model against the first set of features and the second set of features to produce a set of outputs, wherein the executing comprises:
applying a first portion of the trained model to the second set of features;
combining the first set of features with outputs of the first portion of the trained model to produce combined feature data; and
applying a second portion of the trained model to the combined feature data to generate the set of outputs, the set of outputs comprising a set of input parameters for a testing process, a set of output parameters for the testing process, and a set of classes;
configuring, by the one or more processors, the testing process,
the testing process configured based on the set of outputs, and
the testing process configured to test at least a portion of a test dataset using a set of test conditions; and
executing, by the one or more processors, the testing process.

2. The method of claim 1, wherein the first portion of the trained model comprises a long short term memory (LSTM) layer and the second portion of the trained model comprises a classifier.

3. The method of claim 2, wherein the first set of rules is configured to generate the intermediate dataset using one or more data conditioning processes,
the one or more data conditioning processes comprising one or more processes selected from the group consisting of: removal of punctuation, removal of stop words, removal of spaces, lemmatization, stemming, sentence segmentation, and tokenization.

4. The method of claim 2, wherein the second set of rules is configured to sequence the intermediate dataset and vectorize the intermediate dataset,
the second set of features comprising vectorized data.

5. The method of claim 2, wherein the trained model is configured to generate the set of outputs based on the first set of features and the second set of features.

6. The method of claim 5, further comprising:
identifying test data based on the set of input parameters and the set of output parameters; and
generating the set of test conditions based on the set of input parameters, the set of output parameters, and the set of classes.

7. The method of claim 1, wherein configuring the testing process based on the set of outputs comprises generating one or more scripts,
the one or more scripts configured to analyze at least the portion of the test dataset using the set of test conditions.

8. A non-transitory computer-readable storage medium storing instructions that, when executed by one or more processors, cause the one or more processors to perform operations comprising:
receiving an input dataset comprising natural language data;
executing a first set of rules against the input dataset to generate an intermediate dataset and a first set of features, the first set of features comprising numeric features;

executing a second set of rules against the intermediate dataset to generate a second set of features from the intermediate dataset, the second set of features comprising non-numeric features;

executing a trained model against the first set of features and the second set of features to produce a set of outputs, wherein the executing comprises:

applying a first portion of the trained model to the second set of features;

combining the first set of features with outputs of the first portion of the trained model to produce combined feature data; and applying a second portion of the trained model to the combined feature data to generate the set of outputs, the set of outputs comprising a set of input parameters for a testing process, a set of output parameters for the testing process, and a set of classes;

configuring the testing process based on the set of outputs, wherein the testing process is configured to test at least a portion of a test dataset using a set of test conditions; and executing the testing process.

9. The non-transitory computer-readable storage medium of claim 8, wherein the first portion of the trained model comprises a long short term memory (LSTM) layer, and the second portion of the model comprises a classifier.

10. The non-transitory computer-readable storage medium of claim 9, wherein the first set of rules is configured to generate the intermediate dataset using one or more data conditioning processes, the one or more data conditioning processes comprising one or more processes selected from the group consisting of: removal of punctuation, removal of stop words, removal of spaces, lemmatization, stemming, sentence segmentation, and tokenization.

11. The non-transitory computer-readable storage medium of claim 9, wherein the second set of rules is configured to sequence the intermediate dataset and vectorize the intermediate dataset, the second set of features comprising vectorized data.

12. The non-transitory computer-readable storage medium of claim 9, wherein the trained model is configured to generate the set of outputs based on the first set of features and the second set of features.

13. The non-transitory computer-readable storage medium of claim 12, further comprising:

identifying test data based on the set of input parameters and the set of output parameters; and generating the set of test conditions based on the set of input parameters, the set of output parameters, and the set of classes.

14. The non-transitory computer-readable storage medium of claim 8, wherein configuring the testing process based on the set of outputs comprises generating one or more scripts, the one or more scripts configured to analyze at least the portion of the test dataset using the set of test conditions.

15. A system comprising:
a memory; and
one or more processors communicatively coupled to the memory and configured to:

receive an input dataset comprising natural language data;

execute a first set of rules against the input dataset to generate an intermediate dataset and a first set of features, the first set of features comprising numeric features;

execute a second set of rules against the intermediate dataset to generate a second set of features from the intermediate dataset, the second set of features comprising non-numeric features;

execute a trained model against the first set of features and the second set of features to produce a set of outputs, wherein the executing comprises:

applying a first portion of the trained model to the second set of features;

combining the first set of features with outputs of the first portion of the trained model to produce combined feature data; and applying a second portion of the trained model to the combined feature data to generate the set of outputs, the set of outputs comprising a set of input parameters for a testing process, a set of output parameters for the testing process, and a set of classes;

configure the testing process,
the testing process configured based on the set of outputs, and
the testing process configured to test at least a portion of a test dataset using a set of test conditions; and execute the testing process.

16. The system of claim 15, wherein the first portion of the trained model comprises a long short term memory (LSTM) layer and the second portion of the trained model comprises a classifier.

17. The system of claim 16, wherein the first set of rules is configured to generate the intermediate dataset using one or more data conditioning processes, the one or more data conditioning processes comprising one or more processes selected from the group consisting of: removal of punctuation, removal of stop words, removal of spaces, lemmatization, stemming, sentence segmentation, and tokenization.

18. The system of claim 16, wherein the second set of rules is configured to sequence the intermediate dataset and vectorize the intermediate dataset, the second set of features comprising vectorized data.

19. The system of claim 16, wherein the trained model is configured to generate the set of outputs based on the first set of features and the second set of features, the one or more processors configured to:
identify test data based on the set of input parameters and the set of output parameters; and
generate the set of test conditions based on the set of input parameters, the set of output parameters, and the set of classes.

20. The system of claim 15, wherein configuring the testing process based on the set of outputs comprises generating one or more scripts, the one or more scripts configured to analyze at least the portion of the test dataset using the set of test conditions.

* * * * *